(12) United States Patent
Zheng et al.

(10) Patent No.: US 11,277,975 B1
(45) Date of Patent: Mar. 22, 2022

(54) LED PLANT GROWTH LAMP WITH ULTRAVIOLET (UV) LAMP BEADS OR INFRARED (IR) LAMP BEADS

(71) Applicant: Guangzhou Natural Light Intelligent Lighting Appli, Guangzhou (CN)

(72) Inventors: Zexin Zheng, Guangzhou (CN); ZhengBao Lu, Guangzhou (CN); XiBiao Xu, Guangzhou (CN); Hua Zheng, Guangzhou (CN); XiaoJun Zheng, Guangzhou (CN); HaiLiang Zheng, Guangzhou (CN)

( * ) Notice: Subject to any disclaimer, the term of this patent is extended or adjusted under 35 U.S.C. 154(b) by 0 days.

(21) Appl. No.: 17/400,182

(22) Filed: Aug. 12, 2021

(30) Foreign Application Priority Data

Jun. 21, 2021 (CN) .......................... 202110688214.2
Jun. 21, 2021 (CN) .......................... 202121386728.4
Jun. 21, 2021 (CN) .......................... 202121386729.9

(51) Int. Cl.
  *A01G 7/04* (2006.01)
  *F21V 23/00* (2015.01)
  *F21V 23/04* (2006.01)
  *F21Y 113/10* (2016.01)
  *F21Y 115/10* (2016.01)

(52) U.S. Cl.
  CPC ............ *A01G 7/045* (2013.01); *F21V 23/003* (2013.01); *F21V 23/045* (2013.01); *F21V 23/0464* (2013.01); *F21Y 2113/10* (2016.08); *F21Y 2115/10* (2016.08)

(58) Field of Classification Search
  CPC ..... A01G 7/045; F21V 23/003; F21V 23/045; F21V 23/0464
  USPC .......................................................... 362/231
  See application file for complete search history.

(56) References Cited

U.S. PATENT DOCUMENTS

| | | | |
|---|---|---|---|
| 10,624,275 B1* | 4/2020 | Lewis ..................... | A01G 9/249 |
| 2017/0130909 A1* | 5/2017 | Yeon ....................... | H01L 33/50 |
| 2017/0241632 A1* | 8/2017 | Nguyen .................. | F21V 29/59 |
| 2018/0007845 A1* | 1/2018 | Martin .................... | A01G 7/045 |
| 2018/0224093 A1* | 8/2018 | Dutta ...................... | A01G 7/045 |
| 2019/0259108 A1* | 8/2019 | Bongartz .............. | A01C 21/005 |
| 2019/0364743 A1* | 12/2019 | Lys ........................ | F21V 23/001 |
| 2020/0236870 A1* | 7/2020 | Lys ........................ | G01N 33/0098 |
| 2021/0059123 A1* | 3/2021 | Lys ........................ | H04N 5/2354 |
| 2021/0259160 A1* | 8/2021 | Marder-Eppstein ........................ A01G 27/001 |
| 2021/0307269 A1* | 10/2021 | Massey ................. | A01G 7/045 |

* cited by examiner

*Primary Examiner* — Bryon T Gyllstrom
(74) *Attorney, Agent, or Firm* — Rumit Ranjit Kanakia

(57) ABSTRACT

Provided is an LED plant growth lamp with ultraviolet (UV) lamp beads or infrared (IR) lamp beads. The LED plant growth lamp comprises a lamp body, a sensing module and a control system. The lamp body is provided with an illumination source and the control system. The illumination source is provided with a UV lamp and an IR lamp. The control system is configured to control on/off and light energy intensities of the UV and IR lamps. The sensing module is configured to sense brightness change of the environment and send brightness change data. The control system is configured to receive the brightness change data sent by the sensing module, process the brightness change data and send a control signal to the control system according to the brightness change data. The LED plant growth lamp is simple to control, can greatly reduce power consumption while meeting plant illumination requirement.

7 Claims, 2 Drawing Sheets

LED PLANT GROWTH LAMP WITH ULTRAVIOLET (UV) LAMP BEADS OR INFRARED (IR) LAMP BEADS

TECHNICAL FIELD

The present invention relates to the technical field of plant lamps, in particular to an LED plant growth lamp with ultraviolet (UV) lamp beads or infrared (IR) lamp beads.

BACKGROUND

A plant lamp is a lamp for plants. The plant lamp supplements light to the plants or completely replaces the sunlight based on the principle that plants need sunlight for photosynthesis. Scientific tests prove that light with different wavelengths has different influences on plant growth. Blue-violet light and cyan light in the visible light have a great effect on plant growth and bud formation, and such light can inhibit elongation of plants to make the plants short and thick. Meanwhile, the blue-violet light is also the most important light for controlling cell differentiation; and the blue-violet light can also affect the phototropism of plants. Ultraviolet rays inhibit the formation of some growth hormones in bodies of the plants, so as to inhibit the elongation of stems. The ultraviolet rays can also cause sensitivity of the phototropism and promote formation of anthocyanin like blue light, violet light and cyan light in visible light. Red light in the visible light and infrared light in invisible light can promote germination of seeds or spores and the elongation of stems. Red light may also promote the decomposition of carbon dioxide and the formation of chlorophyll.

The spectrum has a direct effect on the photosynthesis of the plants, and in order to improve the growth quality of the plants, different growth cycles of the plants can be regulated and intervened when necessary.

SUMMARY

In order to overcome the defects in the prior art, the present invention aims to provide an LED plant growth lamp with ultraviolet (UV) lamp beads or infrared (IR) lamp beads. The LED plant growth lamp is simple to control, can greatly reduce the power consumption while meeting the illumination condition requirements of plants, and spectra are not wasted.

According to the technical solution for solving the technical problems in the present invention, the LED plant growth lamp with ultraviolet (UV) lamp beads or infrared (IR) lamp beads includes a lamp body, a sensing module and a control system. The lamp body is provided with an illumination source and a control system, the illumination source is provided with a UV lamp and an IR lamp which are configured to emit light capable of being absorbed by the plants, the UV lamp emits an ultraviolet light source, the IR lamp emits an infrared light source, and the control system is connected to the UV lamp and the IR lamp, and is configured to control on/off and a light energy intensity of the UV lamp and the IR lamp. The sensing module is arranged at a position where the UV lamp and the IR lamp cannot irradiate and configured to sense brightness change of the environment and send brightness change data. The control system is connected to the lamp body and the sensing module and configured to receive the brightness change data sent by the sensing module, process the brightness change data, calculate irradiation time, and send a control signal to the control system according to the brightness change data so that the control system controls the UV lamp and the IR lamp.

As further improvement of the present invention, the illumination source includes a lampshade, UV lamps, IR lamps and a lamp panel, the lampshade and the lamp panel are sequentially connected to form a closed space, the UV lamps and the IR lamps are arranged on the lamp panel, and the UV lamps and the IR lamps are arranged alternately at intervals.

As further improvement of the present invention, the UV lamp and the IR lamp are lamp-bead-shaped LED lamps.

As further improvement of the present invention, the illumination source includes a first lampshade, a UV lamp, a second lampshade, an IR lamp and a lamp panel, the first lampshade and the second lampshade cover the lamp panel to form a closed space, the UV lamp is arranged in the closed space formed by the first lampshade and the lamp panel, the IR lamp is arranged in the closed space formed by the first lampshade and the lamp panel, and the UV lamp is arranged beside the IR lamp.

As further improvement of the present invention, the UV lamp and the IR lamp are tubular LED lamps.

As further improvement of the present invention, a computer is arranged on the control system, and a network module is further provided and is capable of achieving network connection.

As further improvement of the present invention, the sensing module is a solar radiation measuring instrument or a photosensitive sensor, and the sensing module is configured to receive a sunlight radiation intensity and transmit the sunlight radiation intensity to the control system for analysis and processing.

As further improvement of the present invention, the control system is a PLC controller or a singlechip.

As further improvement of the present invention, a power of the UV lamp and a power of the IR lamp are 100 w-2000 w.

As further improvement of the present invention, the UV lamp and the IR lamp which are configured to emit light capable of being absorbed by the plants on the illumination source may be replaced with an IR lamp and an LED chip with a wave band of 660 nm, or with a UV lamp and an LED chip with a wave band of 660 nm, or with an IR lamp, a UV lamp and an LED chip with a wave band of 660 nm.

As another implementation of the present invention, an LED plant growth lamp with ultraviolet (UV) lamp beads or infrared (IR) lamp beads includes a lamp body, a sensing module and a control system.

The lamp body is provided with an illumination source and the control system. The illumination source is provided with a UV lamp and an IR lamp which are configured to emit light capable of being absorbed by the plants, the UV lamp emits an ultraviolet light source, the IR lamp emits an infrared light source, and the control system is connected to the UV lamp and the IR lamp, and is configured to control on/off and a light energy intensity of the UV lamp and the IR lamp.

The sensing module is configured to sense brightness change and measuring a distance, and sending out brightness change data and measured distance data.

The control system is connected to the sensing module, and is configured to receive the brightness change data and the measured distance data which are sent by the sensing module, and send a control signal according to the brightness change data and the measured distance data, and the control system is provided with a network module capable of achieving network connection.

A switch module is connected to the control system and the lamp body, receives a control signal of the control system, and is disconnected from or connected to the lamp body according to the control signal, a switch button is arranged on the switch module, and the switch module can be disconnected from or connected to the lamp body.

A power supply is connected to the switch module and the control system, and is configured to supply power for the switch module and the control system.

Further, a terminal is further included, and the terminal and the control system may be connected to a cloud platform through a network for data exchange.

Further, the network module is an information socket or a wireless network module which can achieve RJ45 communication connection.

Further, the sensing module includes a photosensitive sensor and a distance measuring sensor, the photosensitive sensor is configured to sense brightness change and transmit brightness change data to the controller, and the distance measuring sensor is arranged on the lamp body, and is configured to measure a distance between the lamp body and an irradiated object, and transmit the measured distance data to the control system.

Further, the switch module includes a PLC controller, a plurality of relays and a plurality of switch buttons connected to the relays, the PLC controller is connected to the relays, and the plurality of relays are connected to the plurality of lamp bodies.

Further, the control system is connected to the switch module through the network module.

Further, the control system is electrically connected to the switch module through a cable.

Compared with the prior art, the present invention has the beneficial effects that the UV lamp for irradiating ultraviolet spectra and the IR lamp for irradiating infrared spectra are arranged, with regulation and control through the control system according to environment brightness, such that power consumption of the lamp can be greatly reduced while meeting requirements of the plants, and the spectra are not wasted.

In drawings, 1—lampshade, 2—UV lamp, 3—IR lamp, and 4—lamp panel.

DETAILED DESCRIPTION

The present invention will now be further described with reference to the description of accompanying drawings and embodiments:

Embodiment 1

Figure 1:
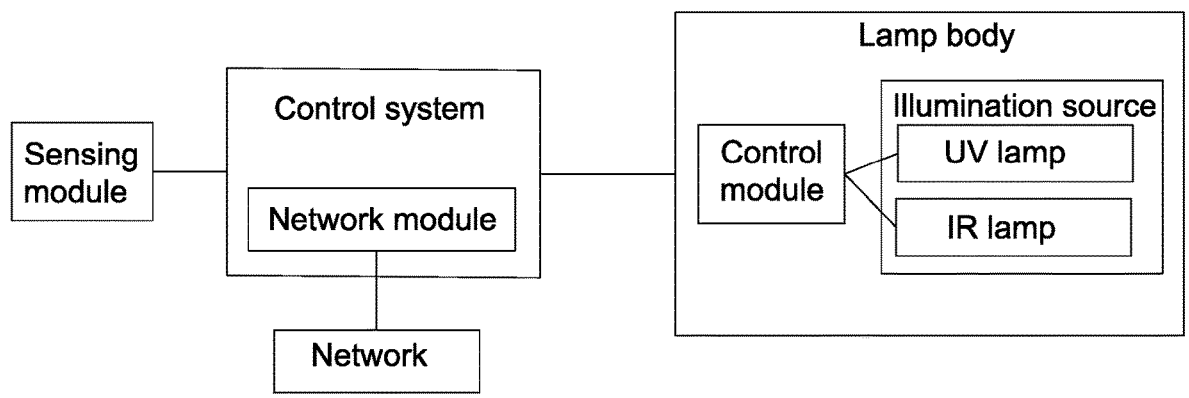
FIG. 1 is a connection structure diagram of the present invention.
Figure 2:
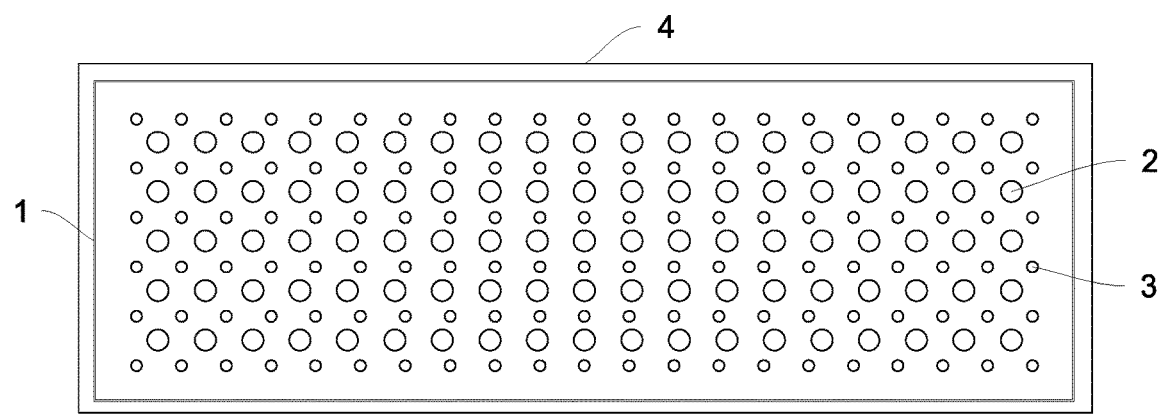
FIG. 2 is a structure diagram of an illumination source in Embodiment 1 of the present invention.
Figure 3:
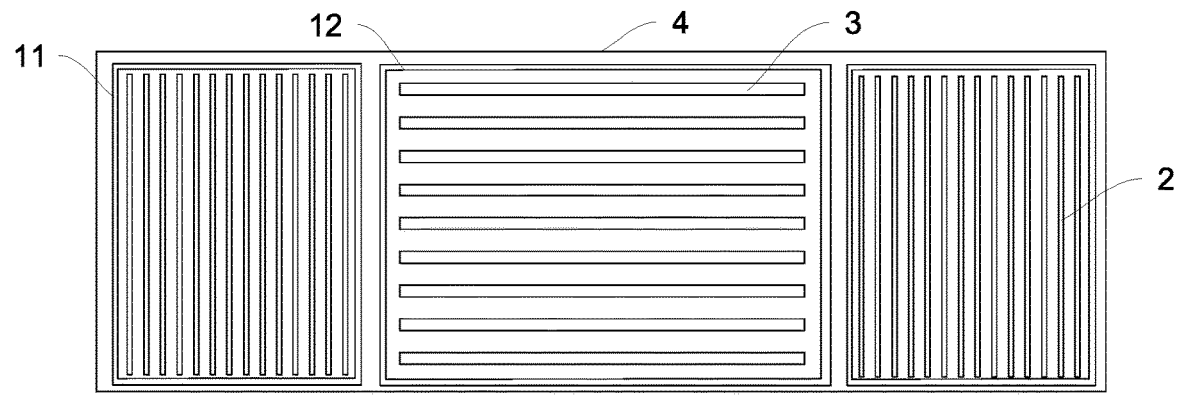
FIG. 3 is a structure diagram of the illumination source in Embodiment 2 of the present invention.

Referring to FIG. 1 to FIG. 3, an LED plant growth lamp with ultraviolet (UV) lamp beads or infrared (IR) lamp beads includes a lamp body, a sensing module and a control system.

the lamp body is provided with an illumination source and a control system. The illumination source is provided with a UV lamp and an IR lamp which are configured to emit light capable of being absorbed by the plants, the UV lamp can emit an ultraviolet light source for promoting growth of the plants, the IR lamp can emit an infrared light source for promoting growth of the plants, and the control system is connected to the UV lamp and the IR lamp, and can be configured to control on/off and a light energy intensity of the UV lamp and the IR lamp. The sensing module is arranged at a position where the UV lamp and the IR lamp cannot irradiate and configured to sense brightness change of the environment and send brightness change dat. The control system is connected to the lamp body and the sensing module, and is configured to receive the brightness change data sent by the sensing module, process the brightness change data, calculate irradiation time, and send the control signal to the control system according to the brightness change data, so that the control system controls the UV lamp and the IR lamp.

In this embodiment, the illumination source includes a lampshade 1, UV lamps 2, IR lamps 3 and a lamp panel 4, the lampshade 1 and the lamp panel 4 are sequentially connected to form a closed space, the UV lamps 2 and the IR lamps 3 are arranged on the lamp panel, and the UV lamps 2 and the IR lamps 3 are arranged alternately at intervals. The UV lamp 2 and the IR lamp 3 are lamp-bead-shaped LED lamps, and a power of the UV lamp and a power of the IR lamp are 100 w-2000 w.

A computer is arranged on the control system, and a network module is further arranged and is capable of achieving network connection. The sensing module is a solar radiation measuring instrument or a photosensitive sensor, and is configured to receive a sunlight radiation intensity and transmit the sunlight radiation intensity to the control system for analysis and processing. The control system is a PLC controller or singlechip.

Working Principle:

When the LED plant growth lamp with ultraviolet (UV) lamp beads or infrared (IR) lamp beads is used, plants are cultivated in a greenhouse, the illumination source is mounted above the plants for supplementing light, the sensing module is arranged at the position where the UV lamp and the IR lamp cannot irradiate, is configured to sense the brightness change of the environment and send the brightness change data, and the control system is configured to receive the brightness change data sent by the sensing module, process the brightness change data, count the calculated irradiation time of the plants, count the production irradiation conditions of the plants, and control the current magnitude of the UV lamp and the IR lamp, control the intensity of the UV lamp and the IR lamp, increase or decrease the irradiation of the UV lamp and the IR lamp according to the brightness intensity in different time periods (morning, noon and night). The UV lamp and the IR lamp are controlled to be on or off through the relays, so as to control the lamps in different colors to provide color temperatures more suitable for plant production, and adapt the production cycle of the plants in the natural environment. The control is simple. Moreover, power consumption of the lamps is greatly reduced, and the spectra may not be wasted.

Embodiment 2

The difference between this embodiment and Embodiment 1 is as follows: the illumination source includes a first lampshade 11, a UV lamp 2, a second lampshade 12, an IR lamp 3 and a lamp panel 4. The first lampshade 11 and the second lampshade 12 cover the lamp panel 4 to form a closed space, the UV lamp 2 is arranged in the closed space formed by the first lampshade 11 and the lamp panel 4, the IR lamp 3 is arranged in the closed space formed by the second lampshade 12 and the lamp panel 4, the UV lamp 2 is arranged on beside the IR lamp 3, and the UV lamp 2 and the IR lamp 3 are tubular LED lamps.

Embodiment 3

The difference between this embodiment and Embodiments 1 and 2 is as follows: the UV lamp and the IR lamp which are configured to emit light capable of being absorbed by the plants on the illumination source can be replaced with an IR lamp and an LED chip with a wave band of 660 nm, or with a UV lamp and an LED chip with a wave band of 660 nm, or with an IR lamp, a UV lamp and an LED chip with a wave band of 660 nm, and the effects are the same.

Embodiment 4

Figure 4:
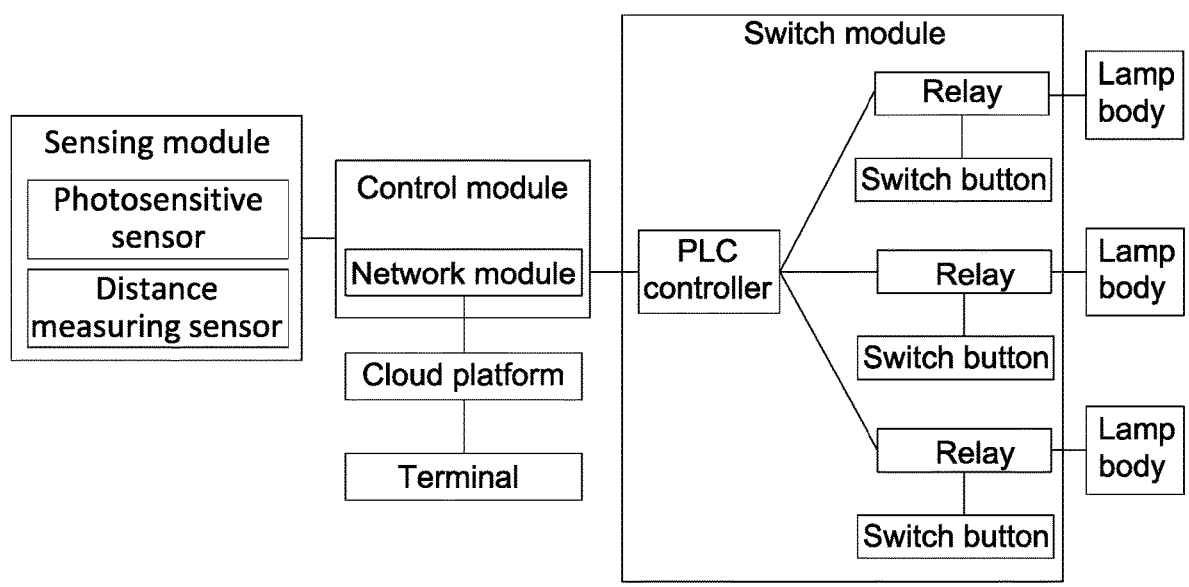
FIG. 4 is a connection structure diagram of Embodiment 4 of the present invention.

The LED plant growth lamp with ultraviolet (UV) lamp beads or infrared (IR) lamp beads, as shown in FIG. 4, includes a lamp body, a sensing module and a control system.

The lamp body is provided with an illumination source and the control system. The illumination source is provided with a UV lamp and an IR lamp which are configured to emit light capable of being absorbed by the plants, the UV lamp emits an ultraviolet light source, the IR lamp emits an infrared light source, and the control system is connected to the UV lamp and the IR lamp, and is configured to control on/off and a light energy intensity of the UV lamp and the IR lamp.

The sensing module is configured to sense brightness change and measuring a distance, and send brightness change data and measured distance data. The control module is connected to the sensing module, and is configured to receive the brightness change data and the measured distance data which are sent by the sensing module, process the brightness change data and the measured distance data, and send a control signal according to the brightness change data and the measured distance data. The control module is provided with a network module capable of achieving network connection. The switch module is connected to the control module and the lamp body, receives the control signal of the control module, and is disconnected from or connected to the lamp body according to the control signal. A switch button is arranged on the switch module, and the switch module CAN be manually disconnected from or connected to the lamp body. The power supply is connected to the switch module and the control module, and is configured to supply power for the switch module and the control module.

A terminal is further included. The terminal and the control module can be connected to a cloud platform through a network for data exchange.

In this embodiment, the control module is a computer, the terminal is a mobile phone terminal or another intelligent equipment terminal, the sensing module includes a photosensitive sensor and a distance measuring sensor, the photosensitive sensor is configured to sense brightness change and transmit brightness change data to the control module, and the distance measuring sensor is arranged on the lamp body, and is configured to measure a distance from the lamp body to the irradiated object and transmit the measured distance data to the control module.

The switch module includes a PLC controller, a plurality of relays and a plurality of switch buttons connected to the relays, the PLC controller is connected to the relays, and the plurality of relays are connected to the plurality of lamp bodies.

The network module is an information socket or wireless network module which can achieve RJ45 communication connection, the control module is electrically connected to the switch module through the network module or a cable, and the lamp body is an LED lamp.

Working Principle:

When the LED plant growth lamp with ultraviolet (UV) lamp beads or infrared (IR) lamp beads is used, plants are cultivated in a greenhouse, the lamp body is mounted above the plants for supplementing light, the photosensitive sensor of the sensing module is arranged at a position where the lamp body cannot irradiate, the sensing module is configured to sense brightness change of the environment, and send the brightness change data, the control module is configured to receive the brightness change data sent by the sensing module, process the brightness change data, count the calculated irradiation time of the plants, count the production irradiation conditions of the plants, and transmit information to the switch module to control the current magnitude of the lamp body, control the intensity of irradiation of the lamp body, increase or decrease the irradiation of the lamp body according to the brightness intensity in different time periods (morning, noon and night). The lamp body is controlled to be on or off through the relays, so as to control the light supplementing intensity of the lamp body to adapt the production period of the plants in a natural environment. The control is simple. Moreover, power consumption of the lamps is greatly reduced, power cannot be wasted, and energy is saved.

The distance measuring sensor of the sensing module is a laser distance measuring sensor which is arranged on the lamp body, and has a same irradiation direction as the lamp body. The laser distance measuring sensor is configured to measure a distance between the lamp body and plants irradiated by the lamp body, by combination of data of a plurality of distance measuring sensors, the distance between the lamp body and the plants irradiated by the lamp body is obtained, information is transmitted to the switch module through the control module to control the current magnitude of the lamp body, and the intensity of the irradiation of the lamp body, irradiation of the lamp body is increased or decreased, and thus, the light supplementing intensity of the lamp body is controlled, the plant lamp adapts to light supplementing of plants in different growth periods and plants in different heights, and intelligent automatic control is realized.

Moreover, the control module can be connected to a network through an information socket or a wireless network module, the terminal and the control module can be connected to the cloud platform through the network for data exchange, by the terminal, the on or off of the lamp body controlled by the control module can be observed, and the irradiation condition of the lamp body is monitored conveniently.

In summary, after reading the document of the present invention, those skilled in the art can make various other corresponding changes without creative mental work according to the technical solutions and concepts of the present invention, and all of them are within the scope of protection of the present invention.

What is claimed is:

1. An LED plant growth lamp with ultraviolet (UV) lamp beads or infrared (IR) lamp beads comprising a lamp body, a sensing module and a control system, wherein the lamp body is provided with an illumination source and a control system, the illumination source is provided with a UV lamp and an IR lamp which are configured to emit light capable of being absorbed by the plants, the UV lamp emits an ultraviolet light source, the IR lamp emits an infrared light source, and the control system is connected to the UV lamp and the IR lamp, and is configured to control on/off and a light energy intensity of the UV lamp and the IR lamp;

the sensing module is configured to sense brightness change and measuring a distance, and sending brightness change data and measured distance data;

the control system is connected to the sensing module, and is configured to receive the brightness change data and the measured distance data which are sent by the sensing module, and sending a control signal according to the brightness change data and the measured distance data, and a network module is further provided and is capable of achieving network connection;

a switch module is connected to the control system and the lamp body, and receives a control signal of the control system, and is disconnected from or connected to the lamp body according to the control signal, a switch button is arranged on the switch module, and the switch module can be manually disconnected from or connected to the lamp body; and a power supply is connected to the switch module and the control system, and is configured to supply power for the switch module and the control system.

2. The LED plant growth lamp according to claim 1, further comprising a terminal, wherein the terminal and the control system can be connected to a cloud platform through a network for data exchange.

3. The LED plant growth lamp according to claim 1, wherein the network module is an information socket or a wireless network module which can achieve RJ45 communication connection.

4. The LED plant growth lamp according to claim 1, wherein the sensing module comprises a photosensitive sensor and distance measuring sensor, the photosensitive sensor is configured to sense brightness change and transmit brightness change data to the control system, and the distance measuring sensor is arranged on the lamp body, and is configured to measure a distance from the lamp body to an irradiated object, and transmit the measured distance data to the control system.

5. The LED plant growth lamp according to claim 1, wherein the switch module comprises a PLC controller, a plurality of relays and a plurality switch buttons connected to the relays, the PLC controller is connected to the relays, and the plurality of relays are connected to the plurality of lamp bodies.

6. The LED plant growth lamp according to claim 1, wherein the control system is connected to the switch module through the network module.

7. The LED plant growth lamp according to claim 1, wherein the control system is electrically connected to the switch module through a cable.

* * * * *